Jan. 2, 1934.　　　A. O. AUSTIN　　　1,941,732
DIVERTING ENERGY FROM TRANSMISSION LINES
Filed Aug. 30, 1930　　　2 Sheets-Sheet 1

INVENTOR
Arthur O. Austin.
BY
Alpheus J. Crane
ATTORNEY

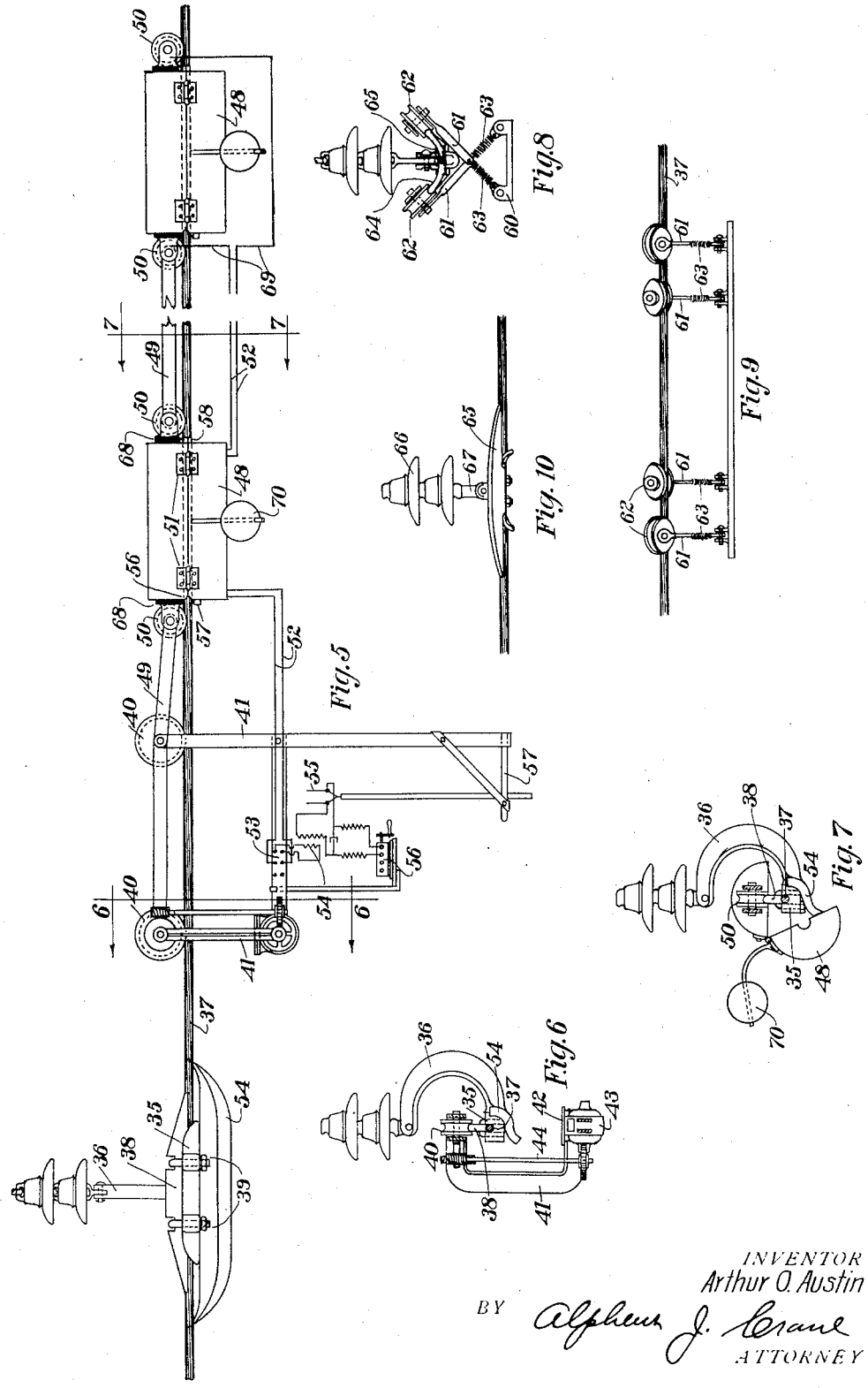

Patented Jan. 2, 1934

1,941,732

UNITED STATES PATENT OFFICE 1,941,732

DIVERTING ENERGY FROM TRANSMISSION LINES

Arthur O. Austin, near Barberton, Ohio, assignor, by mesne assignments, to The Ohio Brass Company, Mansfield, Ohio, a corporation of New Jersey Application August 30, 1930. Serial No. 479,009

11 Claims. (Cl. 175—183)

This invention relates to process and apparatus for diverting energy from transmission lines, and has for one of its objects the provision of a simple process and apparatus by which a limited amount of energy may be obtained from a high voltage transmission line with a minimum of danger and expense.

A further object is to provide apparatus of the class named which shall be of improved construction and operation.

Other objects and advantages will appear from the following description.

The invention is exemplified in the combination and arrangement of parts shown in the accompanying drawings and described in the following specification, and it is more particularly pointed out in the appended claims.

In the drawings:

Fig. 5 is a somewhat diagrammatic elevation showing another application of the invention.

Fig. 6 is a section on line 6—6 of Fig. 5.

Fig. 7 is a section on line 7—7 of Fig. 5 but showing the transformer passing over the supporting clamp.

Fig. 8 is a diagrammatic view similar to Fig. 6 showing another form of carriage support.

Fig. 9 is a side elevation of the carriage shown in Fig. 8.

Fig. 10 is a side elevation of the supporting clamp and cam track for guiding the carriage, shown in Figs. 8 and 9, past the conductor support.

In transmission lines, it is frequently desirable to obtain energy from a line at different points, particularly those in inaccessible regions and, at the same time, not to endanger life. One difficulty of obtaining the energy has been the difficulty of providing transformers which will step-down high voltages.

The present invention provides a new method, however, which has many advantages and may be readily applied for testing out the line or for obtaining energy for other purposes, either during construction or after the installation of the main conductors. The method consists fundamentally of using the current flowing through the conductor rather than the potential to ground. The current flowing through the conductor is used to energize a transformer which may then be utilized to supply the necessary voltage or to correct for variations in the current in the main conductor.

Figure 1:
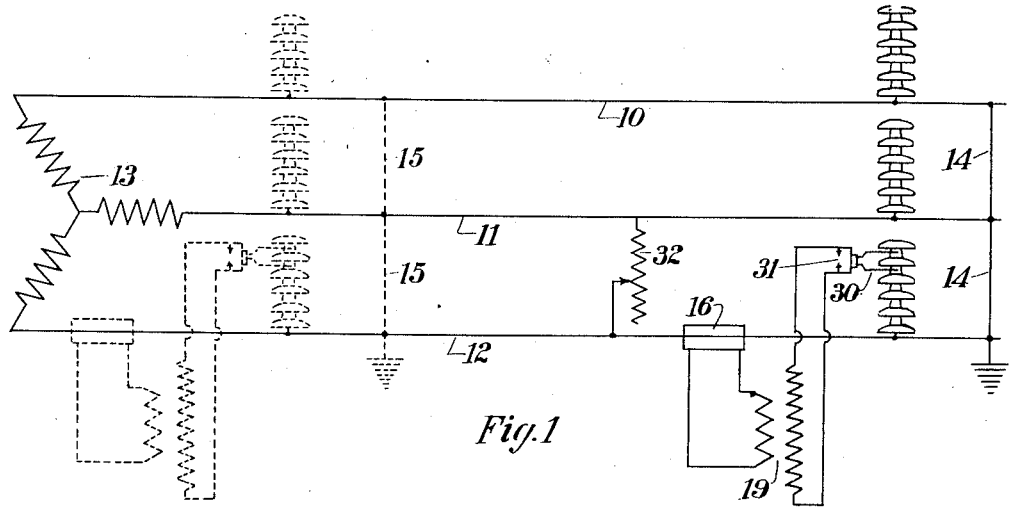
Fig. 1 is a wiring diagram illustrating one application of the present invention.

Fig. 1 shows one application of the invention to a transmission line having three conductors 10, 11 and 12. The conductors may be energized singly or collectively by a suitable transformer or generator 13 at the end of the line. At any other point on the line the conductors may be connected together by jumpers 14. It is evident that the only energy required to cause a given flow of current in the conductor is that required to overcome line impedance. Where the distance from the supply end of transformer 13 to the shorting jumpers 14 is small or the frequency low, the required current may be caused to flow without a very high voltage at the generator end.

In case, however, that the line is long, a very appreciable voltage may be necessary at the generator end 13. This voltage need not give rise to any serious disadvantages or occasion any danger to those working on the system with the method used, as work may be started near the jumpers 14 and proceed toward the generator 13. As the work proceeds toward the generating end, other jumpers 15 may be added so that at all times the voltage drop adjacent the working station will be rather small and, with only minor precautions, need not endanger life. In order to obtain energy from the system, a transformer 16 is employed.

Figure 2:
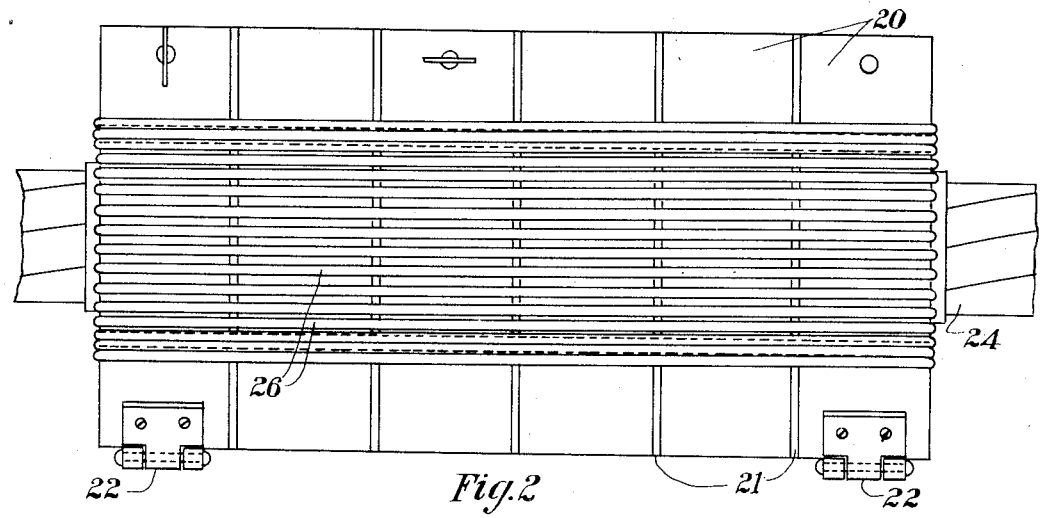
Fig. 2 is an elevation of a current transformer comprised in the present invention.
Figures 3, 4:
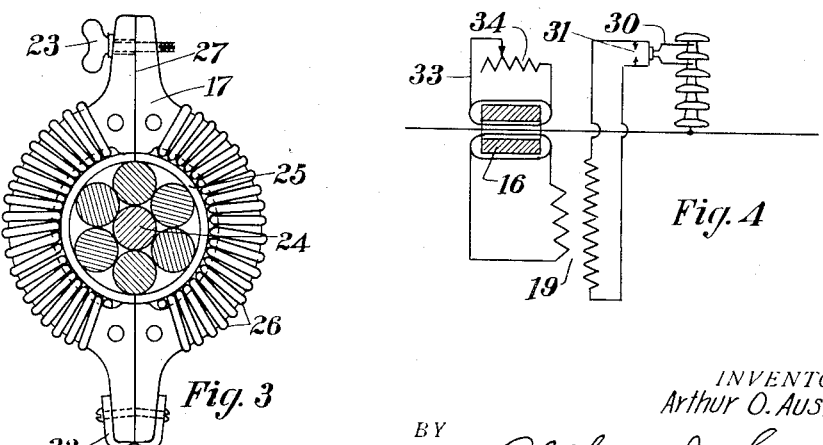
Fig. 3 is an end view of the transformer shown in Fig. 2.
Fig. 4 is a diagram showing a slightly different arrangement for regulating the current induced in the secondary of the current transformer.

As shown in Figs. 2 and 3 the transformer has a magnetic circuit 17 placed around the conductor. This transformer may have a movable magnetic block similar to that used in current transformers which permits threading the magnetic circuit over the conductor. By controlling the air gap by means of the block, it is possible to regulate the magnetic flux in the core 17 and thereby control the voltage or current in the secondary.

In the form of current transformers shown in Figs. 2 and 3 the magnetic circuit comprises an elongated tubular member of magnetic material made up of split sections 20, separated by interposed layers of insulation 21 and held together by bolts extending through the sections 20 from end to end of the core. The sections are secured together at one side by hinges 22 and are provided with thumb screws 23 for clamping the sections together about a conductor 24. A layer of insulation 25 is preferably interposed between the conductor 24 and the windings 26 which are wound upon the core member. This arrangement, as will be seen, produces a short magnetic circuit, but one of large cross sectional area, because of the length of the core member in the direction of the conductor 24.

The extended contact surfaces of the sections 20 decrease the reluctance of the air gap where the sections 20 fit against each other so that the total reluctance of the magnetic circuit may be kept small. In order, however, to regulate the amount of current induced in the winding of the transformer, the air gap 27 may be adjusted by the screws 23 by opening or closing the sections 20 upon their hinges 22 and locking them in their adjusted positions. Part of the screws 23 may be arranged to draw the parts together and one or more screws may be arranged to force them apart, so that the jaw sections may be locked into position with any amount of air gap desired, or the parts may be clamped tightly together. In this way, the current in the secondary circuit may be regulated to suit different requirements.

Another method of controlling the current or voltage in the secondary circuit 26 is to control the current in the main conductors 10, 11 and 12 which may be readily adjusted at the source if preferred. Energy may be taken from the secondary 26 in accordance with well-known laws familiar to electrical designers. In order to facilitate transportation, the transformers may be made up of several transformers or in sections. The amount of energy which it is possible to obtain from the transformer will depend upon the construction of the transformer, the amount of current flowing and the frequency. This method has many applications such as testing out transmission lines.

Instead of varying the current in the transmission line, the same effect can be secured by diverting a portion of the current by a shunt having an adjustable resistance 32, as shown in Fig. 1.

Still another method of controlling the current in the secondary is to provide the core with a closed circuit winding 33 having an adjustable resistance 34, as shown in Fig. 4.

Another method of regulating the voltage or current taken from the secondary is by the use of taps connected at different points on the secondary. It will be understood that any of the other usual methods of controlling voltage and current may be employed.

One application of the invention is to attach the secondary 26 to a transformer 19, as shown in Fig. 1, which will develop sufficient potential to indicate a faulty insulating member. The voltage thus obtained may be applied to any insulator on the line by means of a contact fork 30 or other suitable device. An arcing gap 31 is provided to show a discharge when the insulator is satisfactory and to indicate a fault by the absence of such a discharge. The method may also be used for supplying energy for cleaning or coating conductors or for carrying on necessary mechanical work on the transmission line either in effecting alternations or in building the line, as it is evident that the line may be energized as the construction proceeds, thereby furnishing necessary current for many operations without using dangerous potentials.

In many transmission lines it is very difficult not only to inspect but even to reach some of the towers. Where the conductors are large, they are amply strong to carry considerable loads. With the above described method of diverting energy from the conductor, it is possible to place a carrier on the conductor which will carry a person to any point on the span or along the line by the energy coming from the conductor. This method may be applied to advantage in inspecting the conductor for breaks or for reaching difficult points for making repairs. By properly equipping the line with suitable supporting clamps, it is possible to have the whole carriage equipment pass over the points of support, thereby greatly speeding up the operation.

In the application of the invention shown in Figs. 5, 6 and 7, a hanger or clamp 35 with a goose-neck 36 supports the conductor 37. The grip piece 38 is held by bolts 39 to the clamp body 35 and has tapered ends so that the trolley wheel 40 may move readily over the support. These trolley wheels support a carriage travelling along the conductor and may be made of any suitable material so as to obtain sufficient friction or so as to prevent damage to the conductor. Where several wheels are used, the load on any wheel may be limited if desired by any suitable spring or other suspension. This individual spring mounting for the wheels tends to facilitate passage of the carriage over the clamps, cable joints or other obstructions.

The arrangement to be described permits the current transformer, made in two parts, to be opened up so as to allow it to pass over the clamp. The transformer may be opened up automatically or by hand as desired. In order to facilitate opening of the transformer against the magnetic force acting on its core, it is possible to short-circuit the secondary winding or the special winding shown at 33 in Fig. 4. This tends to neutralize the field set up by the current in the main conductor and allows the current transformer to be opened readily. Upon coming to an obstruction, therefore, for which it is desired to open the transformer, the magnetic pull of the two halves of the transformer is eliminated as far as possible before an attempt is made to open the transformer. Ordinarily, the magnetic pull of the two parts of the transformer tends to eliminate any possibility of the carriage dropping from the conductor even though holding screws or safety hooks are not applied. In fact, the magnetic force tending to hold the two parts of the magnetic core together eliminates the necessity for any holding device other than means which will insure proper registration of the parts. By compensating for the weight two magnetic parts may be brought together very easily after opening. If two transformers are used, separated longitudinally, it is possible to utilize the energy from one transformer to propel the carriage across an obstruction while the other transformer is open and inoperative. Ordinarily, the two transformers can operate in either series or parallel. The combined out-put of the two makes it possible to maintain a higher speed on the smooth sections of the conductor.

In my application Serial Number 479,010, filed August 30, 1930 is shown a current transformer which is used to furnish power for moving a carriage along the conductor. This scheme is particularly applicable to testing lines as the operator doing the testing may ride on a suitable carriage and apply the test to insulators; the conductor providing a good method of travel, saving much time in rough country. At the same time, sufficient energy may be obtained for subjecting each disc in the supporting insulators to an appreciable voltage which will readily determine whether or not it has failed. This method may also be used to furnish energy for the high voltage megger method of testing, disclosed in my application Serial Number 479,008, filed August 30, 1930. In the high voltage megger scheme the current obtained from the secondary of the current transformer may be rectified or used directly on the primary of the induction coil by which a high voltage is applied to the insulator under test. If the equipment is portable, the megger and all of the other devices may be carried on a suitable carriage or traveler. Even though the scheme is not used to transport operators or repairmen, it may be used to transport the equipment or other material from point to point as a switch may be readily located on the apparatus which will neutralize the current transformer or throw the driving mechanism out of gear. This will result in a great saving where test equipment or other material has appreciable weight, making it difficult to carry. Equipment of this kind is readily adapted to old lines as the operator can shift a suitably made carriage at the points of support.

The trolley wheels 40 carry U-shaped hangers 41 which support a platform 42 on which a motor 43 is mounted. The shaft 44 is driven by a motor 43 and drives the trolley 40 for propelling the carriage along the conductor 37. One or more current transformers 48 is attached to the carriage by means of links 49 and is provided with rollers 50 which travel on the conductor 37. The transformers 48 are split horizontally; the two halves being connected by hinges 51. A suitable spring or counterweight 70 balances the weight of the lower half of the transformer and normally holds the transformer closed. The transformers will be wound in a manner similar to that shown in Figs. 2 and 3 and connected by leads 52 to a switch 53 on a motor carriage. A cam track 54 is mounted on the carriage 35, the end of the track being positioned to enter a notch 56 at the forward end of the transformer to force the lower half of the transformer downwardly, thus opening the transformer so that it will pass the support as shown in Fig. 7. When the transformer has passed the supporting clamp 35, the upper half will ride down from the upper face of the grip bar 38 and the lower bar will swing upwardly under the force of the spring, and the two halves will be drawn together about the conductor 37. The forward transformer will thus again assume its operation before the rear transformer engages the end of the cam track 54 so that only one transformer will be disconnected at a time.

In order to facilitate opening of the transformer, a switch 57 will be located at the forward end of the transformer in position to engage the cam track 54 before the cam track begins to open the transformer. This switch may be arranged to short-circuit the secondary turn or the special winding 33 in order to neutralize the magnetic field in the transformer core. A second switch 58 is located at the rear of the transformer for restoring the circuit when the transformer is again closed about the conductor 37. The current from the transformer may be carried to the motor 43 when the switch 53 is closed in one direction or may be shifted to testing apparatus when the switch is thrown in the opposite direction.

The testing apparatus comprises a transformer or spark coil 54 connected to a test fork 55 and a megger 56; the megger and test fork being applied to the insulators to be tested, in the manner described in my copending application Serial Number 479008. In the present instance, the spark coil 54 is energized by current from the transformer instead of from a battery, as described in my copending application. A platform 57 is provided for the operator which will permit him to travel with the carriage along the line to test the insulators supporting the line or for any other purpose desired.

In Figs. 8 and 9 there is shown a modified form of carriage having a platform 60 provided with links 61 supported by trolley wheels 62 arranged to run upon the cable 37. The links 61 may be provided with springs 63 if desired. It will be noted that the links are disposed at an angle to the vertical so that the trolley wheels 62 will be inclined. Alternate links and wheels are inclined in opposite directions.

The conductor clamps 64 are provided with cam tracks 65 extending at an angle to the vertical so that the wheels 62 will travel on these tracks over the supporting clamps. The clamps may be supported from insulators 66 by means of links 67 extending vertically between the inclined track 65. This construction makes it possible to maintain a short distance between the conductor 37 and the lower end of the insulator string. Apparatus similar to that shown in Fig. 5, or any other apparatus for which the carriage is used, may be mounted on or suspended from the platform 60. A switch for neutralizing the magnetic pull on the transformer and means for opening the transformer so as to permit it to pass over the clamp may be attached to the arms 61 so as to be operated by these arms when they are spread by the cam tracks 65.

There will be a drop in potential in the transmission conductor across the reactance produced by the current transformer core surrounding the conductor. A metallic connection to the conductor passing around the magnetic core would therefore constitute a short-circuit or path for the current in the main conductor and it would reduce the amount of energy available in the secondary of the current transformer. This is eliminated by using insulated shive wheels for supporting the transformer, insulation in the shive wheels themselves, or insulation in the supporting structure or attached frame, as shown at 68, Fig. 5. In general, however, the matter is easily taken care of as the voltage drop is small. Wheels made of wood, rubber or containing insulating bushings readily provide the necessary insulation. A magnetic core alone may be used to produce an appreciable drop in voltage in the main conductor and a shunt circuit as shown at 69, Fig. 5, contacting with the conductor at opposite sides of the core may be used to provide the desired energy. This arrangement is explained more fully in my previous application Serial Number 413,378.

In case the shunt circuit is used for providing energy, a transformer having a primary and a secondary is used to obtain the necessary potential; the two supporting shive wheels on either side of the transformer being conducting but insulated from each other. These shives provide contact with the transmission line and are connected by a circuit passing through the transformer or equipment which it is desired to use. If sufficient voltage is obtained without transformation the transformer is unnecessary. For fixed positions, it is evident that conductors could be clamped or attached to the conductor at either side of the magnetic core as shown in my prior application.

In some installations both a direct current and an alternating current may be used to advantage on the main conductors; the conductor normally carying one phase of a polyphase circuit being used for the direct current and another conductor for the alternating current. The alternating current may be used to propel the carriage between supports without any connection to ground. As a transmission line has little impedance for a direct current, a comparatively low voltage may be applied by insulating the conductors from ground. The voltage of the direct current will then be available to operate the test circuit, particularly where this is used to energize a spark coil or other high voltage device. With this arrangement the line would normally be out of use for the regular transmission of power. The direct current voltage can be applied by any suitable generator or battery to one phase in a delta system or to the neutral in a Y connected system. This arrangement would permit of a rather small amount of energy to be taken off by causing the direct current from any of the conductors to flow to ground through the desired load.

It is evident that the method of diverting energy from a transmission line is applicable to a line under normal conditions of operation and voltage, as well as to a line where the voltage is reduced to a very small quantity by a short. Where it is desired to obtain energy from the line while the line is under normal operating conditions, it is of course essential that ample clearance be maintained to ground so that a short-circuit will not result as the equipment passes the towers or supporting structures. By using a properly insulated ladder or platform, it is possible for an operator to mount the carriage without the necessity of lowering the voltage on the transmission line. The proper insulating ladder may be carried with the structure, permitting the operator to ascend or descend from the carriage at any convenient point. Where the voltage is high, it may be necessary to provide a screened carriage or cage for eliminating charging current between the operator and the equipment.

I claim:

1. The combination with a transmission line, of means for energizing said line with alternating current, means for short-circuiting said line at different distances from said energizing means, and a current transformer adapted to be applied to said line at various positions along the length thereof adjacent the points where the line is short-circuited.

2. The combination with a transmission line, of a source of alternating current for energizing said line, said line being short-circuited at a distance from said source, a current transformer applied to said line adjacent said short circuit point but between said source and short-circuited point, a potential transformer having its primary winding connected with the secondary of said current transformer, and an electrical translating device supplied with energy from the secondary of said potential transformer.

3. The method of utilizing energy from a transmission line having a source of alternating current connected therewith comprising the steps of short-circuiting said line successively at different points thereon, and applying a current transformer to said line adjacent the point where it is short-circuited.

4. The method of utilizing energy along a transmission line circuit consisting of a plurality of conductors energized from a source of alternating current, comprising the steps of connecting said conductors to form a short-circuit at successive positions along the line and applying a current transformer adjacent the point where the lines are short-circuited to divert energy from the circuit.

5. The method of utilizing energy from a transmission line having a source of alternating current connected therewith comprising the steps of grounding said line successively at different points thereon, and applying a current transformer to said line adjacent the grounded points to divert the desired energy from the line.

6. The method of testing insulators along a transmission line having a source of alternating current connected therewith comprising the steps or grounding or otherwise shorting the line adjacent the insulator to be tested, applying a current transformer to the line adjacent the point where it is shorted, connecting the secondary of the current transformer to the primary of a step-up potential transformer and applying of a steppage from the secondary of said potential transformer to the insulator part to be tested.

7. The process of utilizing a limited amount of energy from a high potential transmission line comprising the steps of short-circuiting a limited portion of the line, energizing said portion by alternating current at a voltage materially less than the normal voltage of the line and applying a current transformer to the energized portion at a point remote from the source of energy to utilize the current therein for inducing current in the secondary of the transformer and connecting the current transformer secondary with a translating device to be energized.

8. The method of utilizing limited amounts of energy at positions distributed along a high voltage transmission line comprising the steps of successively short-circuiting the line at different positions therealong, energizing the short-circuited portions of the line by means of alternating current at voltage materially less than the normal voltage of the line and applying a current transformer to the portions of the line thus energized adjacent the short-circuit point thereof to divert the desired energy therefrom.

9. The method of utilizing energy from a high voltage transmission line comprising the steps of energizing a portion of said line by alternating current therein at a voltage materially less than the normal voltage of said line and applying a current transformer to the portion of the line thus energized at a point remote from the source of energy for diverting energy fom said line.

10. The method of utilizing energy from a high voltage transmission line comprising the steps of shorting a portion of the line to permit operation thereof at a reduced voltage and applying a current transformer to the shorted portion of the line adjacent the end thereof remote from the source of energy and operating said current transformer from current flowing in said line at the reduced voltage.

11. The method of testing insulators supporting a high voltage transmission line comprising the steps of grounding or otherwise shorting the line adjacent the insulator to be tested, energizing the shorted portion of the line by an alternating current at a voltage materially less than the normal voltage of the line, applying a current transformer to the portion of the line thus energized, stepping up the voltage of the current transformer secondary and applying the stepped-up voltage to the insulator to be tested.

ARTHUR O. AUSTIN.